Dec. 12, 1939.   E. LEHR ET AL   2,183,459
DEVICE FOR MEASURING MECHANICAL MOVEMENTS
Filed April 26, 1938   9 Sheets-Sheet 1

Fig.1

Inventors
Ernst Lehr and
Hugo Granacher
By A.D.Adams
Attorney

Dec. 12, 1939.    E. LEHR ET AL    2,183,459
DEVICE FOR MEASURING MECHANICAL MOVEMENTS
Filed April 26, 1938    9 Sheets-Sheet 5

Fig. 11    Fig. 10

Inventors
Ernst Lehr and
Hugo Granacher
By A. D. Adams
Attorney

Dec. 12, 1939.  E. LEHR ET AL  2,183,459
DEVICE FOR MEASURING MECHANICAL MOVEMENTS
Filed April 26, 1938  9 Sheets-Sheet 6

Inventors
*Ernst Lehr* and
*Hugo Granacher*
By
*A. S. Adams*
Attorney

Patented Dec. 12, 1939

2,183,459

UNITED STATES PATENT OFFICE 2,183,459

DEVICE FOR MEASURING MECHANICAL MOVEMENTS

Ernst Lehr and Hugo Granacher, Berlin, Germany, assignors to Askania-Werke A. G., a corporation of Germany Application April 26, 1938, Serial No. 204,406
In Germany March 27, 1937

17 Claims. (Cl. 33—148)

This invention relates to devices for measuring mechanical movements or stresses of a work-piece to be stressed for example by lengthening, bending, torsional, or lateral, or swinging strains.

One object of the invention is to produce a measuring device capable of being mounted on machine-parts which are stressed by very high stressing values, which exist particularly in variations of cross-sections of the tested work-piece, such as recesses, grooves, or angle-formed machine-parts. As the beforementioned parts are barely accessible, a measuring device can only be used with a measuring length as small as possible, for instance of 2 mm.

Another object of the invention is a measuring device satisfying the beforementioned conditions, comprising means for amplifying the variations of the measuring to 1 or 5 mm., visible on the indicating scale. This may be illustrated by the fact that on stressing a work-piece of steel in only one axis, variations of a measuring length of 2 mm. by 1/10000 mm., correspond to a change of the mechanical stress of 1 kg./mm.$^2$. In some cases an exactness of measurement of 0.1 kg./mm.$^2$ being necessary, the measuring values have to be amplified 10,000- or 50,000-fold of the measured length variation.

A further object of the invention is to provide a measuring device which is simple and reliable in use and which has smallest dimensions.

Other objects and advantages will appear from a consideration of the following description. For a more complete understanding of this invention reference may be had to the accompanying drawings in which.

Figure 1:
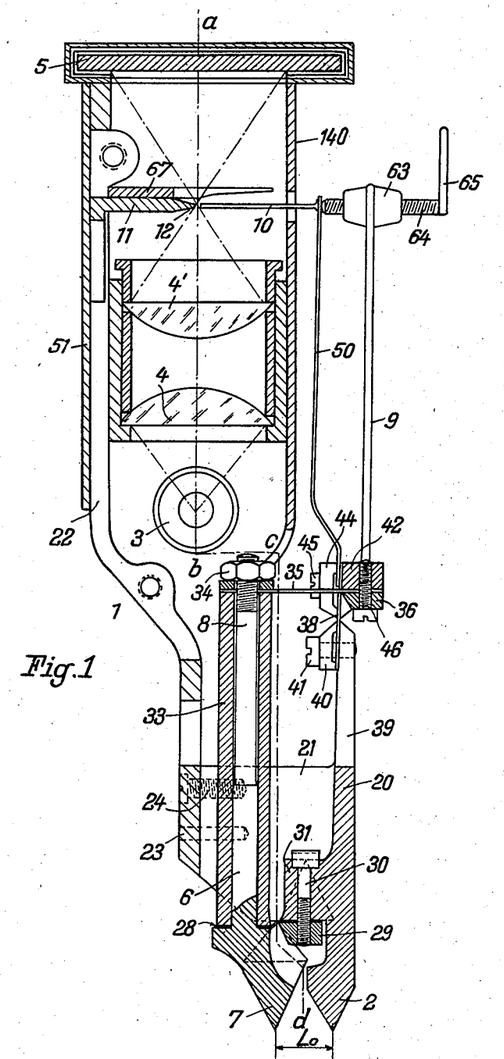
Fig. 1 shows a side elevation of a complete measuring device in vertical section, particularly designed for measuring stretching of a work-piece.
Figure 2:
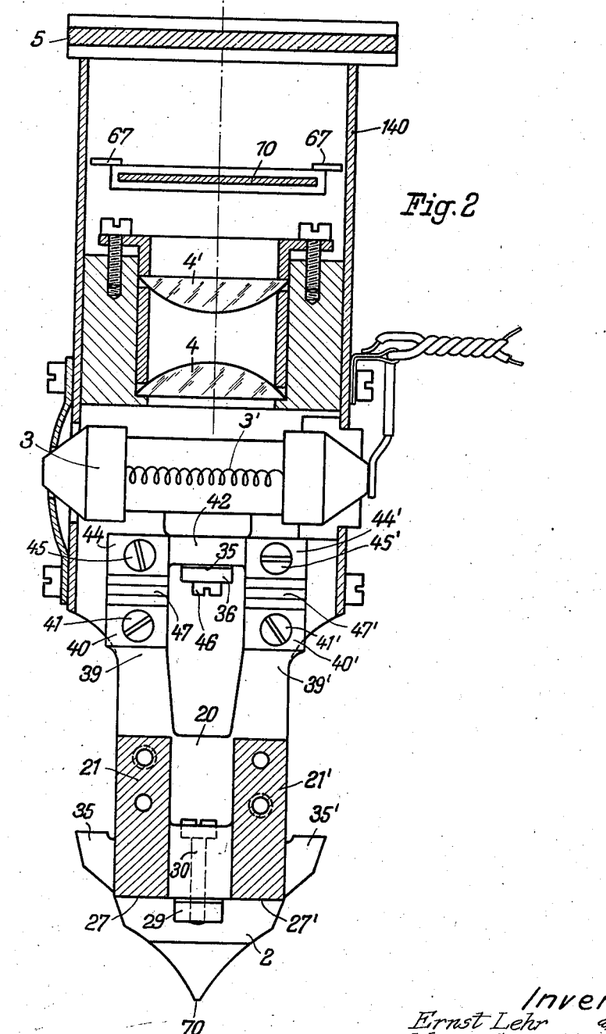
Fig. 2 shows a sectional view of the device according to Fig. 1 taken on line $a, b, c, d$ of Fig. 1.

The embodiment of the invention may first of all be explained by shortly illustrating the device shown in Figs. 1 and 2, the device being particularly designed for measuring the stretching of a work-piece.

According to these figures a support 20 of the casing 1 is provided with a measuring point 2 extending downward and engaging one end of the measuring length $L_0$ on the work-piece to be tested e. g. a cone-shaped indentation of the work-piece. The support 22 of the casing 1 connected to the support 20 carries an electric lamp 3, two condenser lenses 4, 4', and a photocell 5, the condenser lenses directing a beam of light sent out by the lamp 3 upon said photocell. A two-armed lever 6 is turnably mounted on the casing 1, one arm of the lever ending in a measuring point 7, extending also downward and engaging the other end of the measuring length L₀, e. g. another cone-shaped indentation of the work-piece to be tested. The measuring points 2 and 7 are pressed against the work-piece by means of a device provided with bearings engaging the knife edges 35, 35' arranged outside of the support 20. On stretching the work-piece the measuring point 2 remains relatively immovable with respect to the work-piece whilst the other measuring point 7 is turning about the axis of revolution of the two-armed lever 6. The end of the other lever arm 8 transmits its movement upon a support 42 swingably mounted on the upper ends of the support 20, the support 42 carrying a steering diaphragm support 50 and a wire stirrup 9 bearing a nut 63 for an adjusting screw 64 which may be operated by a handle 65 for adjusting the position of the steering diaphragm 10 connected to the upper end of the diaphragm support 50 with respect to the diaphragm 11 fixedly mounted on the support 22 of casing 1. Swinging of the lever arm 8 caused by variations of the measuring length is followed by a variation of the slit 12 formed by the edges oppositely arranged to each other of the two diaphragms 10 and 11 and to the same degree by a change of the surface of the photocell 5 exposed to the beam of light passing through the slit 12. Lever 6 and diaphragm support 50 form a double mechanical transmission for amplifying the movement of the measuring points relatively to each other. In practical use the size of that mechanical transmission is chosen e. g. in such manner that the turning of the steering diaphragm support 50 amplifies about 50-fold the variations of the measuring length. Further amplification is realized by the use of the photo-electrical device.

Very important is the fact that the two-armed lever 6 is tiltably mounted on the support 20 without permitting any play. The same demand has to be fulfilled with respect to the mounting of support 42 for swinging movement. Therefore, the movement of the diaphragm 10 and the intensity of light passing through the slit which is variable by means of the diaphragm 10 are equal in proportion to the variations of the measuring length. On the other hand, the photocell, exposed by the beam of light, supplies a current which is equal in proportion to said intensity of light; as a result the deflection of the pointer of a micro-amperemeter connected to said photocell is equal in proportion to the variation of the measuring length.

Further details of the construction of the tension-meter may be explained by the following description.

Figures 3, 4, 5, 6, 7, 8:
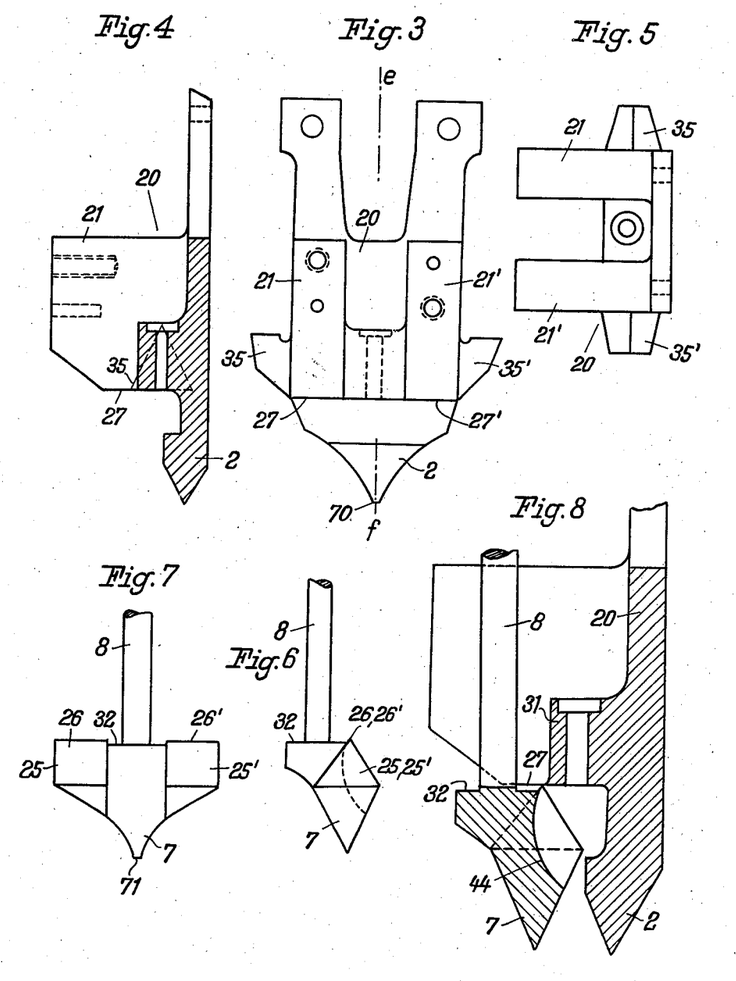
Fig. 3 shows a front end view of one of the two measuring point supports used with a measuring device according to Figs. 1 and 2.
Fig. 4 shows a vertical section of Fig. 3 taken on line $e, f$ of Fig. 3.
Fig. 5 shows a plan view of the same part as represented in Figs. 3 and 4.
Fig. 6 shows a side elevation with parts broken away of the other measuring point support used with a measuring device according to Figs. 1 and 2.
Fig. 7 shows a front end view of the part shown in Fig. 6 with parts broken away.
Fig. 8 shows a vertical sectional view on enlarged scale of parts shown in Figs. 3 to 7 built together, parts being broken away.
Figure 9:
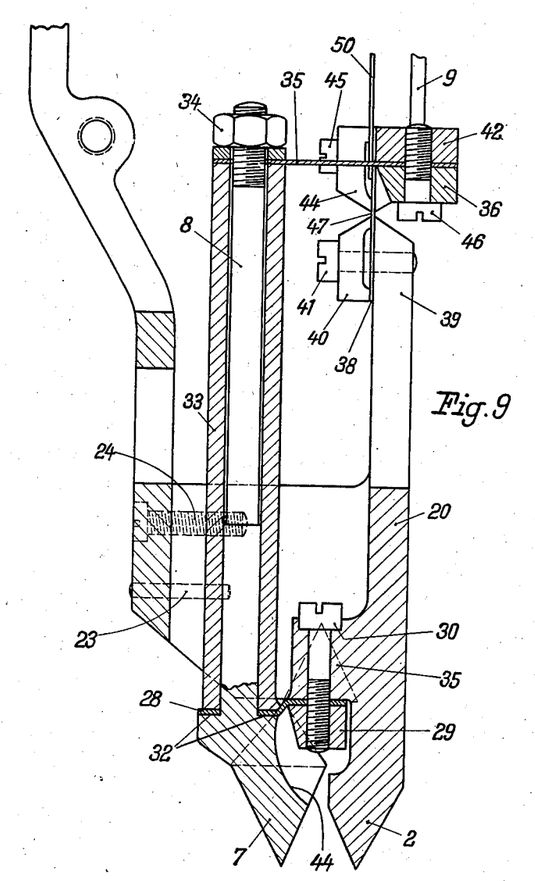
Fig. 9 shows a vertical sectional view on the same enlarged scale of the complete lower part of the measuring device shown in Fig. 1.
Figures 10, 11:
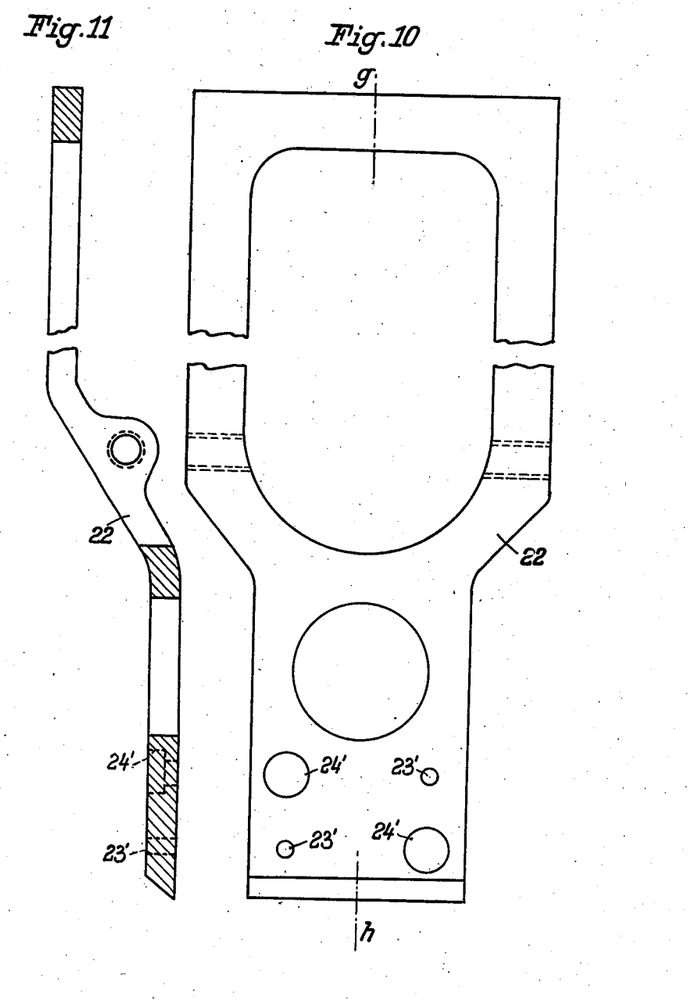
Fig. 10 shows in front end view a detail of the measuring device shown in Fig. 1 on the same enlarged scale as Figs. 8 and 9.
Fig. 11 shows a side elevation of the part shown in Fig. 10 taken on line $g, h$ of Fig. 10.

The casing 1 comprises as beforementioned two supports 20 and 22 connected to one another. Support 20 has at its lower end the measuring point 2 relatively immovable with respect to the work-piece to be tested and above this point two lateral projections 21, 21', both parallel to each other, the fronts of which are fastened to the support 22 (Figs. 10 and 11), a housing 140 being connected thereto containing the electric lamp 3, the optical means 4, 4', and the fixed diaphragm 11, by means of conical pins 23 fitting into the holes 23' of the support 22 for securing exactly the position of the support 20 with respect to the support 22 and by means of screws 24 fitting into holes 24' of the support 22. The lower surfaces 27, 27' of the projections 21, 21' are formed as planes lying in the same vanishing line. The support of the turnable measuring point 7 is a two-armed lever 6 with its one arm in the shape of a shaft 8 of circular or otherwise formed cross-section and with its other arm forming the measuring point 7 extending downward and having two knife edges 25, 25' directed upward which are symmetrically arranged with regard to the axis of the shaft 8 and with the tops 26, 26' of the knife-edges 25, 25' lying in one line or in other words in a vanishing line. The knife-edges 25, 25' lie with their tops 26, 26' against the lower plane surfaces 27, 27' of the projections 21, 21' (Fig. 8), the tops of the knife-edges forming thereby the axis of rotation about which the two-armed lever 6 is turnable. The position of the axis of revolution of the lever 6 with respect to the support 20 and therewith the position of the two measuring points 2 and 7 relative to each other before measuring is secured exactly by means of a yielding metal strip 28 (Figs. 1 and 9) preferably in the form of a leaf spring lying between the bearing planes 27, 27' for the knife-edges 25, 25'. This metal strip is connected with its one end to the support 20 by a screw 30 passing through an eye-piece 31 lying between the two projections 21, 21' and by a nut 29 pressing said end of the metal strip 28 against the lower surface of the eye-piece lying in the same plane as the surfaces 27, 27' of the projections 21, 21'. With its other end the metal strip 28 lies on a plane bearing surface 32 perpendicular to the axis of the shaft 8 and surrounding the lower end of said shaft. A sleeve 33 surrounding the shaft 8 is pressed against the surface 32 by a nut 34 engaging the upper screw-threaded end of the shaft 8. The free length of the metal strip 28 is made as small as possible so as to avoid any undesired play in direction of the measuring length and for the same reason the beforementioned members enclosing the free length of the metal strip 28 are formed as knife-edges, thus forming a pivot point between the points, where the tops 26, 26' of the knife-edged portions 25, 26' lie against the plane bearing surfaces 27, 27'.

Figure 18:
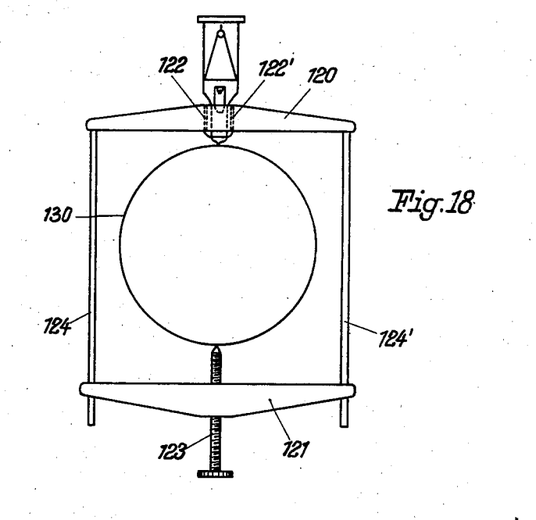
Fig. 18 shows a device for mounting the measuring device according to Figs. 1 to 17 on a work-piece to be tested.

The bearing surface 32 of the lever 6 is recessed by more than the thickness of the metal strip 28 with respect to the tops 26, 26' of the knife-edges 25, 25', whereby the yielding strip gets a bent form, the strip thereby tending to return again into the stretched position. This endeavour is equivalent to a torque, which tends to move the measuring point 7 of the turnable lever 6 to such a degree upward that a stronger pressure of the knife-edges 25, 25' acts on the bearing surfaces 27, 27' of the projections 21, 21'. It is achieved thereby that the tops of the knife-edges 25, 25' are always lying on their bearing surfaces even if the instrument is not mounted on the work-piece to be tested. The part of the lower arm of the lever 6 lying opposite the nut 29 is provided with a recess 44. This recess makes it possible that the members enclosing the free movable length of the metal strip 28 are brought in the greatest proximity. Furthermore, this recess enables the movement of the turnable measuring point 7 without being impeded by the nut 29. Each of the two lateral projections 21, 21' is provided with an external knife-edge 35, 35', the tops of these knife-edges lying in a vanishing line parallel to the vanishing line of the knife-edges 25, 25'; the external knife-edges are provided for the purpose of being engaged by a particular device for pressing the measuring points 2 and 7 against the work-piece to be tested (Fig. 18). The tops of these external knife-edges are arranged in the middle between the two measuring points 2 and 7; the force for pressing the measuring device against the work-piece equally distributing itself thereby on each of the measuring points.

To facilitate the manufacture of the knife-edges 25, 25' these parts are so arranged with respect to the shaft 8 that the vanishing line of the tops of these knife-edges lies perfectly free in other words somewhat remote from the circumferential line of the cross-section of the shaft 8. There are several advantages due to such an arrangement. First of all it is easy to comprehend that the manufacture of the knife-edges is simplified because the knife-edges are freely accessible from all sides. There is no more difficulty in manufacturing these knife-edges completely alike. Especially when manufacturing these knife-edges it can easily be controlled whether the tops of these edges are lying in one line. Said edges may also easily be brought exactly in line with the furthest end of the turnable measuring point 7. This requirement has to be fulfilled in the case the two-armed lever 6 is installed in the device ready for measurement, as otherwise a torque would arise when mounting the measuring apparatus on the work-piece, said torque should be avoided.

Furthermore the bearing surface 32 for the metal strip 28 which is recessed with respect to the vanishing line of the knife-edges 25, 25' may easily be mechanically produced during the turning process of the shaft. A further advantage results from the use of a two-armed lever above described that the lateral dimensions of the turnable support and therewith of the whole instrument are diminished. Since the measuring apparatus has been developed for the special purpose that even under the most difficult conditions it can be used e. g. in hollows, recess-beads, grooves of machine parts etc., a more compact form would be a means of enlarging the scope of employment.

The bearing knife-edges 25, 25' as well as the measuring point 7 must be hard as glass in view of the least possible wear, whilst the sharp-edged transitions of the bearing plane 32 to the shaft 8 must remain tough. This may be achieved when manufacturing the turnable lever 6 out of steel, by making the shaft thicker than necessary in its part bounding on the bearing surface 32 for the yielding metal strip. The lower part of the lever 6 being then placed in a tempering means, such means influences during the tempering process not only the knife-edges 25, 25' and the measuring point 7 but also the part bounding on the plane bearing surface of the yielding metal strip. In order to avoid hardening of the edged transitions of the plane bearing surface 32 to the shaft the excess thickness of material on the lower part of the shaft, influenced by the tempering means is removed by a turning process. Then the tempering process will be finished. By this the edged transition of the plane bearing surface to the shaft is not hardened but remains tough.

According to the ratio of the length of the shaft 8 to the length of the lower lever arm of the lever 6, the turning movement of the measuring point 7 is amplified, the length of the first named lever arm being the multiple of the length of the second lever arm.

Figure 14:
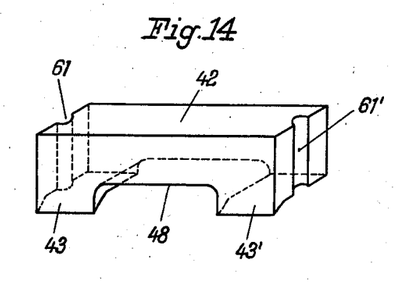
Fig. 14 shows the member carrying the steering diaphragm support and the device for adjusting the steering diaphragm support in perspective front end view.
Figure 15:
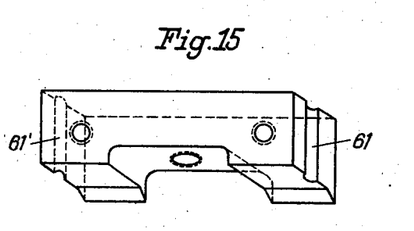
Fig. 15 shows the same part as in Fig. 14 in perspective rear end view.
Figure 16:
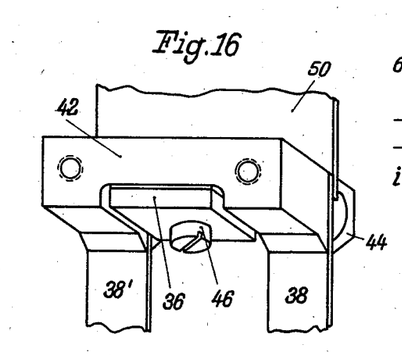
Fig. 16 shows the same part built together with other parts of the measuring device in the same perspective view as in Fig. 15.

The shaft 8 acts with its upper end upon a frame 42, which carries a diaphragm support 50 and an adjusting device 9 for said support both extending upward and which is mounted for swinging movement on the support 20, by means of a second leaf spring 35 extending into the same direction as the metal strips 28 being fastened with its one end to the upper end of the shaft 8 by means of the beforementioned nut 34 pressing that end of the metal strip against the upper surface of the sleeve 33 and being fastened with its other end on the frame 42, the shape of which is illustrated in detail in Figs. 14 and 15 and 16. The frame 42 is mounted on the support 20 by two leaf springs 38, 38' both of which extending perpendicular to and being arranged symmetrically with respect to the leaf spring 35. The frame 42 extends perpendicular to the metal strips 38, 38' and has two lateral plane bearing surfaces 43, 43' symmetrically arranged with respect to the middle and directed towards the interior of the measuring device. The upper ends of the metal strip 38, 38' are pressed against the plane surfaces 43, 43' by means of clamps 44, 44' and screws 45, 45' screwed into the frame 42. The lower ends of said metal strips 38, 38' are mounted on the two arms 39, 39' of the support 20 extending upward by means of clamps 40, 40' and screws 41, 41', each of which pressing one lower end of the metal strips 38, 38' against one arm 39, 39' respectively, of the support 20. The free movable lengths 47, 47' of the two metal strips between the clamping devices form an axis of revolution about which the frame 42 may be turned. They are formed furthermore as small as possible and, therefore, the beforementioned members limiting the free movable length are formed as knife-edges. The middle part of the frame is somewhat recessed with respect to the knife-edged parts of the frame 42 and formed as a plane bearing surface 48 against which the one end of the metal strips 35 is pressed by a clamp 36 and a screw 46.

Attached to the carrier 42 is a spring hammered steel band 50 extending upward and acting as the steering diaphragm support, the lower ends of that band being pressed against the plane bearing surfaces 43, 43' of the carrier 42 by means of the beforementioned clamps 44, 44'. Soldered to the upper end of the steel band 50 at right angles with respect to the band is a steering diaphragm 10. The front edge of the steering diaphragm 10 is arranged in opposed relation with the front edge of the diaphragm 11 inserted in the frame 22 and fixedly mounted by a covering band 51 attached to the frame 22, the two diaphragms forming thereby a slit in which the rays of a source of light 3 are concentrated by means of the condenser lenses 4, 4'. It follows from the foregoing that turning of the upper end of the shaft 8 causes turning of the diaphragm support 50 about its axis of revolution 47, 47' and simultaneously a variation of the slit formed by the two diaphragms thus resulting in different exposures of the photocell 5.

Figures 12, 13:
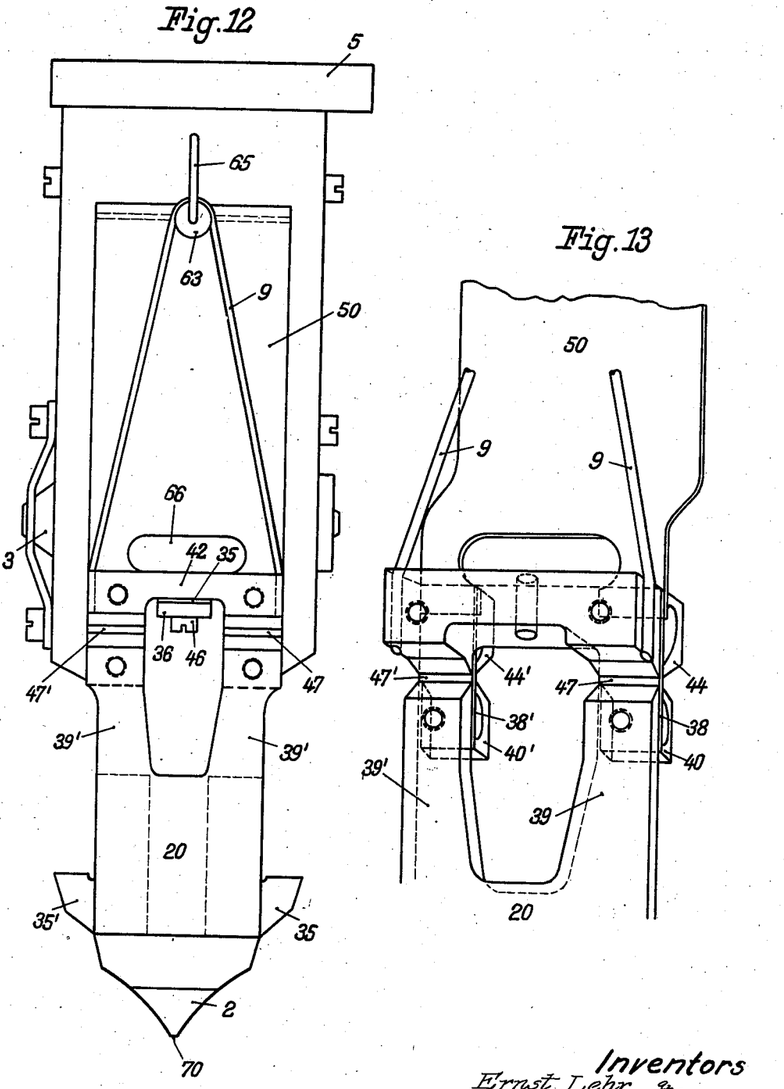
Fig. 12 shows the rear end view of the measuring device on the same scale as in Fig. 1.
Fig. 13 shows on somewhat enlarged scale the perspective rear end view of parts shown in Fig. 12.

The adjusting device for the diaphragm support comprises a wire stirrup 9, being for the most part parallel to the diaphragm support 50, the ends of said stirrup lying in small grooves 61, 61' provided in the outsides of the frame 42 and being fastened to the frame 42 by soldering. Attached to the top part of the wire stirrup by soldering is a nut 63, an adjusting screw 64 screwed in the nut 63 being rotatable by a handle 65 and touching with its front portion the head-end of the steel band 50. This band 50 is weakened to such a degree in its cross-section (Fig. 17) near the lowest surfaces 60, 60' of the band which are pressed by the clamps 44, 44' against the frame 42, the pressed surfaces being limited by the line i—k that close over the limiting line i—k yielding joints 62, 62' are formed, about which the steel band 50 may be tilted. As shown in Figs. 1 and 13 the steel band is bent in its lower portion to such a degree that due to this fact the steel band 50 lies always against the front portion of the adjusting screw 64 even if the screw is perfectly screwed in its nut. When turning the screw more or less into or out of the nut 63 before beginning the measurement tilting of the band 50 around its yielding joints 62, 62' is caused and, therefore, a change of position of the steering diaphragm 10 with respect to the fixed diaphragm 11. Therefore, the diaphragm support 50 may be adjusted by the adjusting screw 64 independently of the position of the two-armed lever 6 and therewith independently of the position of the turnable measuring point 7. The adjustment is, therefore, enabled even in the case the measuring instrument is mounted on the work-piece to be tested. During the measuring process the diaphragm support 50 and the adjusting device are turned simultaneously around the axis of revolution 47, 47'. Due to the low position of the yielding joints of the steel band 50 and as a result of this, due to its long free-movable lever arm, the diaphragm 10 will practically only be rectilinearly shifted whilst remaining in the same plane when adjusting the steering diaphragm 10 before beginning the measurement i. e. the front portion of the diaphragm 10 changes its height during the adjusting process on such a small scale only that the change of height does not disturb the adjustment.

In the described embodiment of the diaphragm support and of the adjusting device these parts are to be constructed as parts of such small weight that when setting up the measuring apparatus in any position, the adjustment of the steering diaphragm is no longer influenced by the weight of these parts. The largest part of amplification is due to reproducing an optical image of the winding 3' of the electric lamp 3 in the slit 12 formed by the two diaphragms and to exposing the photocell 5 by means of the rays of light passing through said slit. On account of moving the steering diaphragm in the plane in which the optical image of the winding 3' is reproduced the sensibility of the measuring device is greatest and, therefore, smallest movements of the steering diaphragm are followed by the greatest variations of the intensity of the light sent out by the electric lamp. Furthermore, by using a wedge-formed beam of light the best result is obtained for exposing the surface of the photocell by means of the smallest possible source of light. To avoid overheating of the photocell the casing of the measuring device is provided with openings, thereby enabling the heat developed by the lamp to flow off without reaching the photocell.

Fig. 18 shows the measuring device as described above mounted on a shaft 130 of circular cross-section. The mounting device comprises two traverses 120, 121, each again comprising two parts geometrically identical lying behind one another. Two cross-pieces 122, 122' are arranged between and extending perpendicular to said upper identical parts, said cross-pieces being connected to said parts. These cross-pieces lie with their lower surfaces against the tops of the external knife-edges 35, 35'. Between the two identical parts of the lower traverse a nut is provided into which an adjusting screw 123 is screwed, whose point engages the shaft at a point lying opposite the middle of the measuring length. The distance of the two traverses 120, 121 may be varied by means of two bolts 124, 124' which connect the traverses.

The tops of the measuring points 2 and 7 are ending in knife-edges 70, 71 extending perpendicular to the measuring length and having preferably a width of 0.1 mm. or less (Figs. 3 and 7), as experience has proved that highest stresses or tensions can only be measured if knife-edged tops of the beforementioned shape are used.

Figure 17:
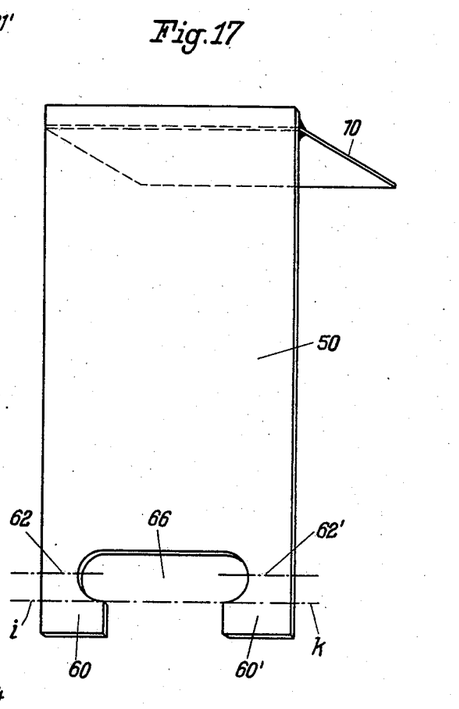
Fig. 17 shows a perspective rear end view of the steering diaphragm support.
Figure 19:
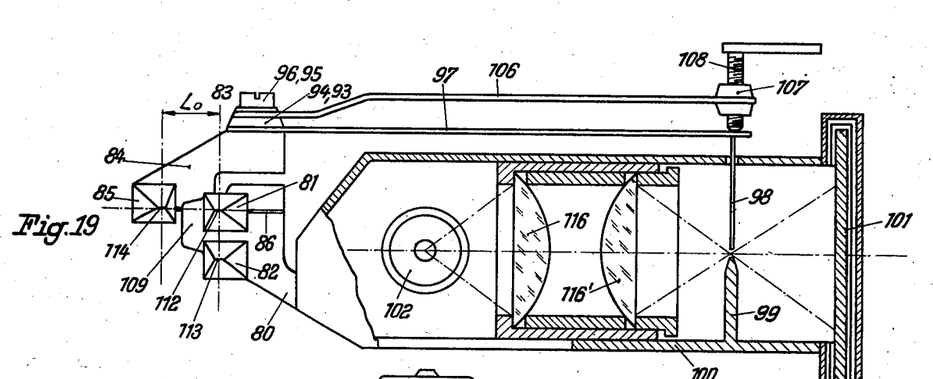
Fig. 19 shows a plan view from below of a complete measuring device, particularly designed for measuring torsional or lateral strains of a work-piece, parts of the measuring device being broken away and parts being shown in vertical section.
Figure 20:
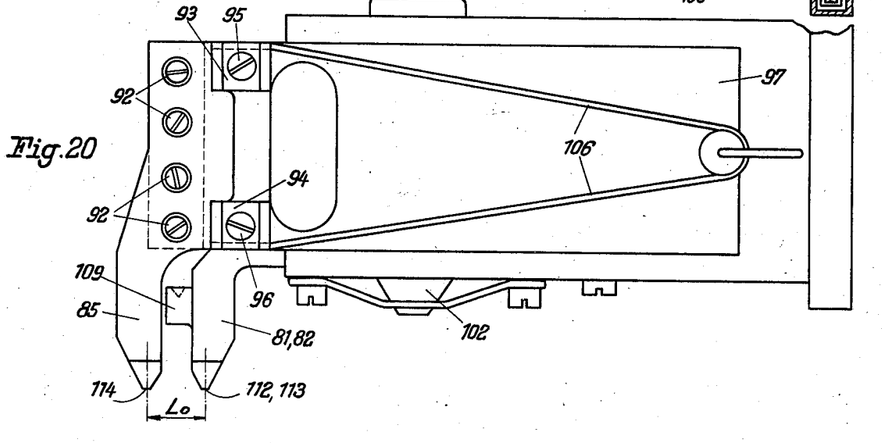
Fig. 20 is a side elevation of the measuring device shown in Fig. 19.
Figure 21:
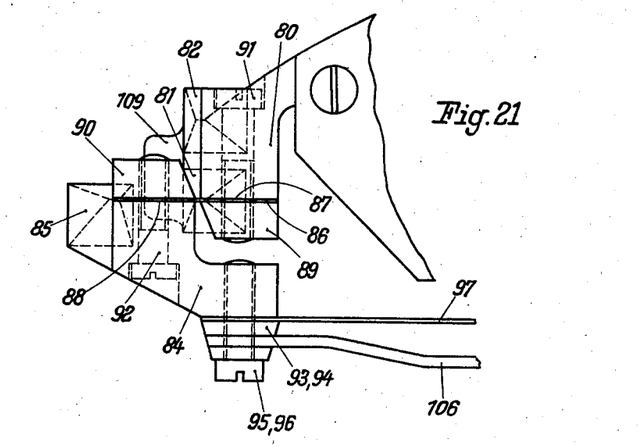
Fig. 21 is a detailed plan view from above of a measuring device shown in Figs. 19 and 20.

Figs. 19 to 21 show by way of another example a device of smallest size for measuring torsional or lateral stresses. 80 is the support of two measuring points 81, 82 lying in the same plane 83 and forming the basis with respect to which the filaments or cross-sections of the work-piece to be tested are displaced under the influence of torsional or lateral stresses. The tops 112, 113 of the measuring points are formed as knife-edges parallel to each other. 84 is the turnable support of another measuring point 85, the top 114 of which is also formed as a knife-edge and is lying in the same line with the knife-edge of the measuring point 81. $L_0$ is the measuring length of e. g. 2 mm. When mounting the measuring device on the work-piece, the knife-edged tops of the measuring points are to be directed perpendicular to the direction into which the filaments or cross-sections are displaced. The development of the tops of the measuring points corresponds to the development of the measuring points of the tensiometer. As Fig. 21 illustrates, a leaf spring 86 is mounted on both supports 80 and 84, whereby both ends of the spring are pressed against plane bearing surfaces 87, 88 of the supports 80 and 84, respectively, by means of nuts 89, 90 and screws 91, 92, the two clamping devices having cutting edges lying opposite each other and enclosing a free movable length of the leaf spring which forms a yielding joint, about which the support 84 is turnable with respect to the support 80. The free movable length of the leaf spring should be as small as possible to avoid any play in direction of the measuring length during the movement of the turnable support. By means of clamps 93, 94 and screws 95, 96 a steel band 97 of relatively great length is clamped on the turnable support 84, the free-movable end of the steel band carrying a steering diaphragm 98, being vertically arranged to the furthest end of the steel band. The form of the steel band is the same as shown by Fig. 17. Opposite the steering edge of the diaphragm 98 is a diaphragm 99 fixedly mounted on the casing 100 of the measuring apparatus, thus forming a variable slit. This slit varies the volume of light sent out from a source of light 102 within the casing. A photocell 101 which lies within the rays of light, is differently exposed according to the size of the slit. This cell produces a photo-electric tension in proportion to the volume of light which strikes said cell. As soon as the measuring point 85 is turned, the diaphragm support 97 is also turned, the diaphragm support 97 thereby magnifying the measuring value.

For the adjustment of the starting position of the diaphragm 98, respectively the zero point of the ammeter lying in the circuit of the photocell there are fastened by soldering to the clamps 93, 94, the ends of a wire stirrup 106 lying in grooves of the clamps 93, 94 in a similar manner as has been explained in the description of the foregoing example. The wire stirrup bears a nut 107 for the adjusting screw 108. A turning back and forth of the adjusting screw 108 causes a movement of the band 97 about its axis of revolution formed by weakened parts of its cross-section as already mentioned in the foregoing description.

The relatively immovable measuring point support 80 bears a socket 109 which acts as bearing for a knife edge or point of the device mounting the measuring apparatus on the work-piece. The socket is arranged so that the mounting force distributes itself on all measuring points. The measuring points are best placed in recesses pressed in the work-piece, thereby achieving a secure mounting of the measuring apparatus without being compelled to use high pressure for mounting the apparatus which would soon blunt the measuring points.

The greatest length of the measuring device developed for practical use is about 40 mm. for the meter firstly described and about 30 mm. for the last described meter.

What is claimed is:

1. A device for measuring small mechanical movements comprising, in combination, a casing; arranged within said casing and fixedly mounted thereto a source of light, a photocell, optical means for directing a beam of light to said photocell; a measuring point fixedly arranged on the outside of said casing; a support bearing another measuring point cooperating with the first measuring point fixedly connected to the casing, thereby forming a measuring length; said support being turnably mounted on said casing for varying the position of the measuring point of said support with respect to said other measuring point and therewith the measuring length; connected to said support and turnable therewith means for variably screening said beam of light in accordance with the variations of the measuring length and means for adjusting said beam of light independently of the position of said support with respect to said casing.

2. In combination with a measuring device for measuring small mechanical movements, two supports, each bearing a measuring point, the two measuring points extending in the same direction and cooperating with one another forming thereby a measuring length; the first support having two bearing surfaces; the second support being formed as a lever with two lever arms, one lever arm ending in one of said measuring points, the other lever arm being formed as a shaft amplifying the movement of said support and symmetrically to which are arranged two knife edges extending in opposite direction with respect to the said measuring point and with their tops lying exactly above the furthest end of the measuring point and in a vanishing line and against the said bearing surfaces of the first support, thereby forming an axis of revolution, about which the second support is turnable; the vanishing line of the tops of said knife edges lying somewhat remote from the circumferential line of the cross-section of the shaft; a yielding leaf spring extending between the two knife edges of the shaft and being mounted with its ends on each of both supports by means of clamping members, thereby forming a free movable length of said leaf spring and therewith a yielding joint, about which the second support is turnable with respect to the first support; the edges of the clamping members limiting the free movable length of the leaf spring being formed as knife edges and being arranged next to each other as to form a free movable length of said leaf spring small enough for avoiding any undesired play in said yielding joint.

3. A measuring device as claimed in claim 2 in which the said shaft has a bearing surface surrounding the inner end of the shaft and lying between the said two knife edges, the tops of which form the axis, about which one of the two supports is turnable; the said bearing surface being recessed with respect to the tops of the said knife edges by more than the thickness of the leaf spring, thereby bending the leaf spring.

4. A measuring device as claimed in claim 2, in which the measuring point of the turnable support lies in a distance of about 2 mm. from the measuring point of the other support; the tops of all measuring points being formed as knife edges extending substantially perpendicular to the measuring length and each having a width of about 0.1 mm. or less.

5. A device for measuring small mechanical movements comprising, in combination, a first support having a measuring point; a casing attached to said support; arranged within said casing and fixedly connected thereto a source of light, a photocell, optical means for directing a beam of light to said photocell, a diaphragm lying in the path of light between said photocell and said optical means; a second support being turnably mounted on said first support and formed as a lever with two lever arms, one lever arm ending in a measuring point cooperating with the measuring point of the first named support, thereby forming a measuring length, the other lever arm being formed as a shaft amplifying the movement of the turnable support; a frame turnably mounted on said first support, the free movable end of said shaft acting upon said frame for turning said frame in accordance to variations of the measuring length; attached to said frame and turnably mounted therewith a lever for further amplifying the movement of said second support; a diaphragm attached to the free movable length of said lever, said diaphragm cooperating with the diaphragm fixedly connected to said casing for variably screening said beam of light in accordance with the movement of the second support and therewith in accordance to the variations of the measuring length; attached furthermore to said frame and turnably mounted therewith means for adjusting said beam of light independently of the position of the second support.

6. A device for measuring small mechanical movements as claimed in claim 2 comprising, in combination, a casing attached to said first support; arranged within said casing and fixedly mounted thereto a source of light, a photocell, optical means for directing a beam of light to said photocell, a diaphragm lying in the path of light between said photocell and said optical means; a frame mounted for swinging movement on the first support by means of two leaf springs extending parallel, but somewhat remote with respect to each other, one of the ends of said leaf springs being clamped on the frame, the other ends of said leaf springs being clamped to the first support, thereby forming a free movable length of each of said leaf springs and therewith a yielding joint, about which the frame is turnable with respect to its support; the edges of the clamping members limiting the free movable lengths of the leaf springs being formed as knife edges and being arranged next to each other as to form free movable lengths of said leaf springs small enough for avoiding any undesired play in each of said yielding joints; said frame being acted upon by the free movable end of the shaft of said turnable support by means of another leaf spring extending between the two leaf springs, by means of which the frame is turnably mounted on the first support; attached to said frame and turnably mounted therewith a spring hammered steel band and a wire stirrup; said steel band forming a lever arm amplifying the movement of the shaft of said turnable support and weakened in its cross-section near the mounting place of said steel band on said frame as to form an axis of revolution, about which the steel band may be turned; a diaphragm connected to and extending perpendicular to the free movable end of said steel band, the said diaphragm cooperating with the diaphragm fixedly mounted on said casing for variably screening said beam of light in accordance with variations of the measuring length; the said wire stirrup extending substantially parallel to the said spring hammered steel band; a nut attached to the top part of the wire stirrup; screwed into the nut an adjusting screw being rotatable by a handle and touching with its front portion the free movable end of the steel band for turning the said steel band about the said axis of revolution and, therefore, for varying the position of said diaphragms relatively to each other independently of the position of said second support.

7. A device for measuring torsional or lateral movements or stresses, comprising, in combination, a first support; two measuring points fixedly connected thereto and arranged at a distance with respect to each other forming thereby a basis line; a second support bearing a single measuring point, said single measuring point lying somewhat remote from the said basis line and cooperating with the two measuring points mounted on the first named support forming thereby a measuring length; the said second support being turnably mounted on the said first named support for varying the position of the said single measuring point with respect to the other measuring points and therewith the measuring length.

8. A device for measuring torsional or lateral stresses or movements comprising, in combination, a support bearing two measuring points which are arranged in a fixed distance with respect to each other, forming thereby a basis line; a second support bearing a single measuring point lying somewhat remote from the said basis line; the said second support being turnably mounted on the said first named support about an axis which is identical with the axis of one of the said two measuring points forming the basis line; the measuring point mounted on the said turnable support lying with the measuring point the axis of which is the turning axis of the turnable support in a line substantially perpendicular to the basis line and cooperating with the said measuring point, thereby forming a measuring length which is variable when turning the second named support with respect to the first named support.

9. A device as claimed in claim 8, in which the tops of all measuring points are knife edged, the knife edges of the two measuring points forming the basis line extending perpendicular to the basis line and parallel to each other; the knife edge of the measuring point mounted on the turnable support lying in line with the knife edge of the measuring point forming the axis about which the said support is turnable.

10. A device for measuring torsional or lateral stresses comprising, in combination, a support bearing two measuring points which are arranged in a fixed distance of about 2 mm. with respect to each other, forming thereby a basis line; a second support bearing a single measuring point lying in a distance of about 2 mm. from the said basis line and cooperating with the two measuring points mounted on the first named support, forming thereby a measuring length; the said second support being turnably mounted on the said first named support for varying the measuring length; the tops of all measuring points being formed as knife edges extending substantially perpendicular to the basis line and each of which having a width of about 0.1 mm. or less.

11. A device for measuring torsional or lateral stresses or movements comprising, in combination, a support bearing two measuring points which are arranged in a fixed distance of about 2 mm., forming thereby a basis line; a second support bearing a single measuring point, said single measuring point lying in a distance of about 2 mm. from the said basis line and cooperating with the measuring points mounted on the first named support forming thereby a measuring length; a leaf spring mounted with its ends on each of both supports by means of clamping members, thereby forming a free movable length of said leaf spring and therewith a yielding joint, about which the second named support is turnable for varying the position of said single measuring point with respect to said other measuring points forming the basis line; the edges of the clamping member limiting the free movable length of the leaf spring being formed as knife edges and being arranged next to each other as to form a free movable length of said leaf spring small enough for avoiding any undesired play in said yielding point.

12. A device as claimed in claim 7, in which the said first support carries a socket forming a bearing for a knife edge or point of a device for pressing the measuring points against the workpiece to be tested; the said socket being arranged so as to equally distribute the pressing force upon all measuring points.

13. A device as claimed in claim 7, in which a casing is attached to the first named support; arranged within said casing and fixedly connected thereto a source of light, a photocell, optical means for directing a beam of light to said photocell; connected to said second support and turnable therewith means for variably screening said beam of light in accordance to the variations of the measuring length and means for adjusting said beam of light independently of the position of said second support with respect to the position of the said first named support.

14. A device as claimed in claim 7, in which a casing is attached to the first named support; arranged within said casing and fixedly connected thereto a source of light, a photocell, optical means for directing a beam of light to said photocell, a diaphragm lying in the path of light between said optical means and said photocell; fixedly mounted on said second support and turnable therewith a diaphragm support forming a lever arm amplifying the movement of said support in accordance to variations of the measuring length, the said lever arm being turnable about an axis of revolution lying next to the mounting place of the lever arm on said support; a diaphragm connected to the free movable end of said lever arm cooperating with the diaphragm fixedly mounted on said casing for variably screening said beam of light in accordance with variations of the measuring length; fixedly mounted on said second support a device for turning the diaphragm support about its axis of revolution, to adjust the position of the said diaphragms relatively to each other.

15. A device as claimed in claim 7, in which a casing is attached to the first named support; arranged within said casing and fixedly connected thereto a source of light, a photocell, optical means for directing a beam of light to said photocell, a diaphragm lying in the path of light between said optical means and said photocell; fixedly mounted on said second support and turnable therewith a spring hammered steel band acting as a diaphragm support and weakened in its cross-section next to the mounting place of the said steel band on its support as to form an axis of revolution, about which the steel band may be turned; a diaphragm connected to and extending perpendicular to the free movable end of said steel band, the said diaphragm cooperating with the diaphragm fixedly mounted on said casing to form a slit, the size of which is variable in accordance with the movement of the said turnable support; a wire stirrup furthermore fixedly mounted on said second support and extending substantially parallel to the spring hammered steel band; a nut attached to the top part of the wire stirrup; screwed into the nut an adjusting screw being rotatable by a handle and touching with its front portion the free movable end of the steel band for turning the said steel band about the said axis of revolution and therewith for varying the position of said diaphragms relatively to each other.

16. A measuring device comprising, in combination, a first support carrying a diaphragm fixedly connected thereto; a second support being turnably mounted on the first support in accordance with the variation of a measuring value; fixedly mounted on said second support and turnable therewith a diaphragm support forming a lever arm amplifying the movement of said support; a second diaphragm connected to and extending perpendicular to the free movable end of said lever arm, the said diaphragm cooperating with the said first diaphragm to form a slit, the size of which is variable in accordance with the movement of the said second support; the said lever arm being rotatable about an axis of revolution lying next to the axis, about which the said second support is turnable with respect to the first support; connected to the said second support and turnable therewith means for turning the said lever arm about its axis of revolution and therewith to adjust the position of the said diaphragms relatively to each other independently of the position of said second support.

17. A measuring device comprising, in combination, a first support carrying a diaphragm fixedly connected thereto; a second support being movable with respect to the first support in accordance with the variation of a measuring value; fixedly mounted on said second support and turnable therewith a spring hammered steel band and a wire stirrup; said steel band forming a lever arm amplifying the movement of its support and being weakened in its cross-section next the mounting place of the said steel band on its support as to form an axis of revolution, about which the steel band may be turned; a second diaphragm connected to and extending perpendicular to the free movable end of said steel band, the said diaphragm cooperating with the diaphragm fixedly mounted on said first support to form a slit, the size of which is variable in accordance with the movement of said second support; the said wire stirrup extending substantially parallel to the said spring hammered steel band; a nut attached to the top part of the wire stirrup; screwed into the nut an adjusting screw being rotatable by a handle and touching with its front portion the free movable end of the steel band for turning the said steel band about the said axis of revolution and, therefore, for varying the position of said diaphragms relatively to each other independently of the position of said second support.

ERNST LEHR.
HUGO GRANACHER.